(12) United States Patent
Wang et al.

(10) Patent No.: US 12,223,116 B2
(45) Date of Patent: Feb. 11, 2025

(54) GESTURE-BASED DISPLAY INTERFACE CONTROL METHOD AND APPARATUS, DEVICE AND STORAGE MEDIUM

(71) Applicant: GOERTEK INC., Shandong (CN)

(72) Inventors: Xiaochen Wang, Shandong (CN); Ke Dong, Shandong (CN)

(73) Assignee: GOERTEK INC., Weifang (CN)

( * ) Notice: Subject to any disclaimer, the term of this patent is extended or adjusted under 35 U.S.C. 154(b) by 0 days.

(21) Appl. No.: 18/262,390

(22) PCT Filed: Aug. 25, 2021

(86) PCT No.: PCT/CN2021/114454
§ 371 (c)(1),
(2) Date: Jul. 21, 2023

(87) PCT Pub. No.: WO2022/156213
PCT Pub. Date: Jul. 28, 2022

(65) Prior Publication Data
US 2024/0077948 A1 Mar. 7, 2024

(30) Foreign Application Priority Data
Jan. 22, 2021 (CN) .......................... 202110078905.0

(51) Int. Cl.
*G06F 3/01* (2006.01)
*G06F 9/4401* (2018.01)

(52) U.S. Cl.
CPC .............. *G06F 3/017* (2013.01); *G06F 3/011* (2013.01); *G06F 9/4418* (2013.01)

(58) Field of Classification Search
CPC ........ G06F 3/017; G06F 3/011; G06F 9/4418; G06F 3/04883; G06F 1/163
See application file for complete search history.

(56) References Cited

U.S. PATENT DOCUMENTS

| 9,116,614 B1 | 8/2015 | De Los Reyes | |
|---|---|---|---|
| 11,086,406 B1 * | 8/2021 | Ravasz | G06F 1/1686 |
| 11,150,730 B1 * | 10/2021 | Anderson | G06F 3/017 |
| 2010/0088632 A1 * | 4/2010 | Knowles | G06F 3/0485 |
| | | | 345/157 |

(Continued)

FOREIGN PATENT DOCUMENTS

| CN | 101369180 A | 2/2009 |
|---|---|---|
| CN | 105022471 A | 11/2015 |

(Continued)

OTHER PUBLICATIONS

Zhong Yang et al., Dynamic Hand Gesture Recognition Using Hidden Markov Models, Jul. 1, 2012, International Conference on Computer Science & Education, pp. 1-6 (Year: 2012).*

(Continued)

*Primary Examiner* — Tam T Tran
(74) *Attorney, Agent, or Firm* — Shih IP Law Group, PLLC

(57) ABSTRACT

A gesture-based display interface control method and apparatus, a device and a storage medium, belonging to the technical field of intelligent devices. The method includes: acquiring a first gesture of a user, and determining whether the first gesture is kept for more than a preset time; if the first gesture is kept for more than the preset time, displaying a target virtual gesture point on the current display interface; and acquiring a second gesture of the user, and moving the target virtual gesture point on the current display interface according to the second gesture. According to the method, the virtual gesture point is displayed on the display interface, and the virtual gesture point is randomly moved on the display interface, so that any interactive control on the current display interface can be operated, and gesture control is more intelligent and comprehensive while improving the accuracy of gesture control.

7 Claims, 7 Drawing Sheets

(56) References Cited

U.S. PATENT DOCUMENTS

| | | | | |
|---|---|---|---|---|
| 2014/0028546 A1* | 1/2014 | Jeon | ............... | G06F 3/04842 |
| | | | | 345/156 |
| 2016/0062320 A1* | 3/2016 | Chung | ............... | G04G 21/025 |
| | | | | 368/282 |
| 2016/0239105 A1* | 8/2016 | Bostick | ............... | G06F 3/0346 |
| 2016/0299570 A1* | 10/2016 | Davydov | ............... | G06F 3/167 |
| 2018/0164892 A1* | 6/2018 | Han | ............... | G06F 3/0346 |
| 2021/0096726 A1* | 4/2021 | Faulkner | ............... | G06F 1/1626 |
| 2021/0124417 A1* | 4/2021 | Ma | ............... | G06F 3/015 |

FOREIGN PATENT DOCUMENTS

| | | | |
|---|---|---|---|
| CN | 106598425 | A | 4/2017 |
| CN | 109696958 | A | 4/2019 |
| CN | 111142775 | A | 5/2020 |
| CN | 112015270 | A | 12/2020 |
| CN | 112817443 | A | 5/2021 |
| DE | 102017218718 | A1 | 4/2019 |
| EP | 2711804 | A1 | 3/2014 |
| WO | 2017049508 | A1 | 3/2017 |
| WO | 2020137592 | A1 | 7/2020 |

OTHER PUBLICATIONS

V-ris Jaijongrak et al., Towards a BSN-based Gesture Interface for Intelligent Home Aplications, Aug. 1, 2009,|CROS-SICE International Joint Conference, pp. 1-5 (Year: 2009).*
International Search Report from International Application No. PCT/CN2021/114454 mailed Nov. 26, 2021.

* cited by examiner

GESTURE-BASED DISPLAY INTERFACE CONTROL METHOD AND APPARATUS, DEVICE AND STORAGE MEDIUM

The present disclosure claims a priority to the Chinese Patent Application No. 202110078905.0, entitled "GESTURE-BASED DISPLAY INTERFACE CONTROL METHOD AND APPARATUS, DEVICE AND STORAGE MEDIUM" filed with China Patent Office on Jan. 22, 2021, the entire contents of which are incorporated into the present disclosure by reference.

TECHNICAL FIELD

The present disclosure relates to a technical field of intelligent devices, and more particularly, to a gesture-based display interface control method and apparatus, a device and a storage medium.

DESCRIPTION OF RELATED ART

Operations of intelligent wearable devices are mostly focused on touch interaction on a screen. However, in some scenarios where a non-wearing hand is occupied, touch interaction cannot be performed, and voice interaction, which is a scenario supplement, has a problem of inconvenience in public places. Therefore, single hand (wearing hand) gesture recognition technology has become the best solution to address these scenarios. At present, the single hand gesture recognition scheme is mainly aimed at several specific actions, such as clenching or spreading the first to make or answer or hang up a phone call, swinging the wrist or turning the wrist to switch screens, etc. On the one hand, it can only perform simple functions, and on the other hand, as a remote operation method, the movement of the wrist will drive the screen to move together, which hinders the transmission of screen information. However, gesture recognition through detection of electromyographic signals has a problem that there is no muscle near the wrist and the electromyographic signals cannot be obtained. Since the operation is aimed at the screen, but fingers of the operator is not actually on the screen during the remote gesture operation, which will easily cause a mismatch between the visual and mental models and lead to confusion. In addition, the current gesture operation can only switch the display interface and cannot accurately control any interactive control in the display interface.

The above is only used to assist in understanding the technical solution of the present disclosure, and does not mean that the above content is admitted as related art.

SUMMARY

A main object of the present disclosure is to provide a gesture-based display interface control method and apparatus, a device and a storage medium, aiming at solving a technical problem of inaccurate gesture operation in the related art.

To achieve the above object, the present disclosure provides a gesture-based display interface control method, the gesture-based display interface control method including:
acquiring a first gesture of a user, and determining whether the first gesture is kept for more than a preset time;
if the first gesture is kept for more than the preset time, displaying a target virtual gesture point on current display interface; and
acquiring a second gesture of the user, and moving the target virtual gesture point on the current display interface according to the second gesture.

Optionally, the method further includes: before acquiring the first gesture of the user, and determining whether the first gesture is kept for more than the preset time, acquiring the current operating status;
determining whether the current operating status is a gesture wake-up state according to a status identification corresponding to the current operating status; and
if the current operating status is a gesture wake-up state, displaying an initial virtual gesture point on the current display interface, and performing the step of acquiring the first gesture of the user, and determining whether the first gesture is kept for more than the preset time.

Optionally, the method further includes: after determining whether the current operating status is the gesture wake-up state according to the status identification corresponding to the current operating status,
if the current operating status is not the gesture wake-up state, acquiring an activation gesture of the user in real time; and
if a number of times that the activation gesture is acquired within a preset time interval reaches a preset number, adjusting the current operating status to the gesture wake-up state.

Optionally, the method further includes: after acquiring the first gesture of a user, and determining whether the first gesture is kept for more than the preset time,
if the first gesture is not kept for more than the preset time, extracting a first gesture action from the first gesture;
determining a first finger movement direction of the user according to the first gesture; and
switching the current display interface through the initial virtual gesture point according to the first finger movement direction.

Optionally, switching the current display interface through the initial virtual gesture point according to the first finger movement direction includes:
when the first finger movement direction is a direction with flexion of a index finger or abduction of the index finger, swiping left or right to switch the current display interface through the initial virtual gesture point; and
when the first finger movement direction is a direction with flexion of a thumb or abduction of the thumb, swiping up or down to switch the current display interface through the initial virtual gesture point.

Optionally, acquiring a second gesture of the user, and moving the target virtual gesture point on the current display interface according to the second gesture includes:
acquiring the second gesture of the user and the current position of the target virtual gesture point on the current display interface; and
moving the target virtual gesture point from the current position to a target position according to a second finger movement direction corresponding to the second gesture.

Optionally, the method further includes: after acquiring the second gesture of the user, and moving the target virtual gesture point on the current display interface according to the second gesture,
acquiring a third gesture of the user;
determining a third finger movement direction according to the third gesture; and clicking or long-pressing an interactive control on the current display interface through the target virtual gesture point according to the third finger movement direction.

In addition, in order to achieve the above object, the present disclosure also provides gesture-based display interface control apparatus, the gesture-based display interface control apparatus including:

an acquisition module configured to acquire a first gesture of a user, and to determine whether the first gesture is kept for more than a preset time;

a display module configured to display a target virtual gesture point on current display interface if the first gesture is kept for more than the preset time; and a moving module configured to acquire a second gesture of the user, and to move the target virtual gesture point on the current display interface according to the second gesture.

In addition, in order to achieve the above object, the present disclosure also provides a wearable device, the wearable device includes: a memory, a processor, and a gesture-based display interface control program stored in the memory and operable on the processor, the gesture-based display interface control program is configured to implement steps of the above-mentioned gesture-based display interface control method.

In addition, in order to achieve the above object, the present disclosure also provides a storage medium, on which a gesture-based display interface control program is stored, and when the gesture-based display interface control program is executed by a processor, steps of the above-mentioned gesture-based display interface control method are implemented.

In the present disclosure, the method includes: acquiring a first gesture of a user, and determining whether the first gesture is kept for more than a preset time; if the first gesture is kept for more than the preset time, displaying a target virtual gesture point on the current display interface; and acquiring a second gesture of the user, and moving the target virtual gesture point on the current display interface according to the second gesture. According to the method, the virtual gesture point is displayed on the display interface, and the virtual gesture point is randomly moved on the display interface, so that any of interactive controls on the current display interface can be operated, and gesture control is more intelligent and comprehensive while improving the accuracy of gesture control.

The implementations, functional features, and advantages of the present disclosure will be further explained in conjunction with the embodiments, with reference to the accompanying drawings.

DETAILED DESCRIPTIONS

It should be understood that the specific embodiments described herein are only used to explain the present disclosure and are not intended to limit the present disclosure.

Figure 1:
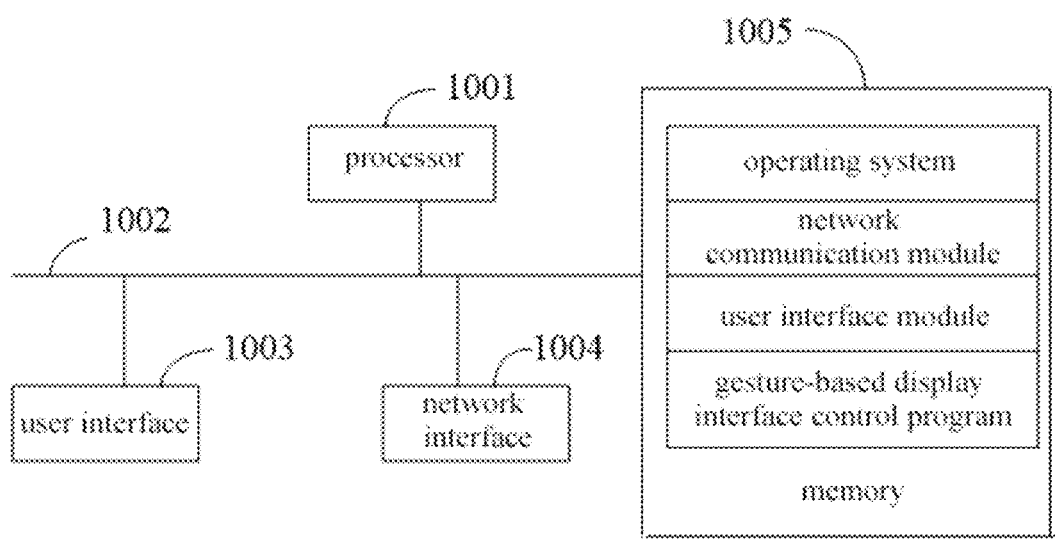
FIG. 1 is a schematic structural diagram of a gesture-based wearable device in a hardware operating environment involved in an embodiment of the present disclosure.

Referring to FIG. 1, FIG. 1 is a schematic structural diagram of a gesture-based wearable device in a hardware operating environment involved in an embodiment of the present disclosure.

As illustrated in FIG. 1, the wearable device may include: a processor 1001 such as a central processing unit (CPU), a communication bus 1002, a user interface 1003, a network interface 1004, and a memory 1005. The memory 1005 is used to realize connection and communication between these components. The user interface 1003 may include a display, an input unit such as a keyboard, and optionally, the user interface 1003 may also include a standard wired interface and a wireless interface. The network interface 1004 may optionally include a standard wired interface and a wireless interface (for example, wireless-fidelity (WI-FI) interface. The memory 1005 may be a high-speed random access memory (RAM), or a stable non-volatile memory (NVM), for example, a disk memory. Optionally, the memory 1005 may also be a storage device independent of the aforementioned processor 1001.

Those skilled in the art will understand that the structure illustrated in FIG. 1 does not constitute a limitation on the wearable device, and more or less components than those illustrated, a combination of some components or different component arrangements can be included.

As illustrated in FIG. 1, the memory 1005, which is a storage medium, may include an operating system, a network communication module, a user interface module, and a gesture-based display interface control program.

In the wearable device illustrated in FIG. 1, the network interface 1004 is mainly used for data communication with a network server, the user interface 1003 is mainly used for data interaction with the user. In the present disclosure, the processor 1001 and the memory 1005 may be disposed in the wearable device, and the wearable device calls the gesture-based display interface control program stored in the memory 1005 through the processor 1001, and performs the gesture-based display interface control method according an embodiment of the present disclosure.

Figure 2:
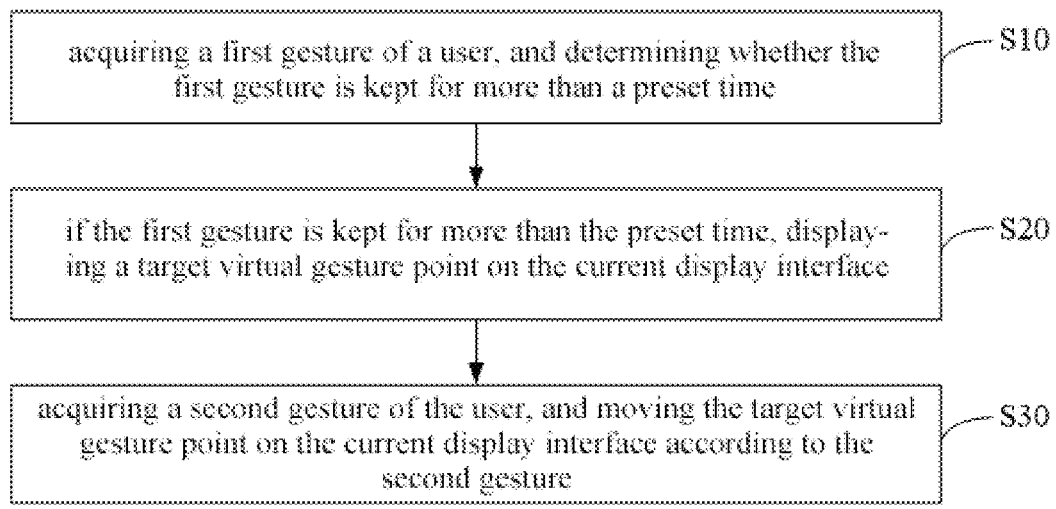
FIG. 2 is a schematic flowchart of a first embodiment of a gesture-based display interface control method according to the present disclosure.

An embodiment of the present disclosure provides a gesture-based display interface control method. Reference is made to FIG. 2, which is a schematic flowchart of a first embodiment of a gesture-based display interface control method according to the present disclosure.

In the embodiment, the gesture-based display interface control method includes the following steps:

Step S10: acquiring a first gesture of a user, and determining whether the first gesture is kept for more than a preset time.

It should be noted that the executive subject of the embodiment may be a processor, or a device capable of realizing the same or similar functions as the processor. The device may include the processor; however, it is not limited thereto. In the embodiment, the processor may be disposed in the wearable device, which is a portable device that is directly worn on the body or integrated into the clothes or accessories (for example, a smart watch or a smart bracelet) of the user. The wearable device is provided with a pressure sensor therein. When the finger of the user is moving, the pressure sensor will be pressed to generate a pressure signal. The processor in the wearable device can detect the pressure signal of the pressure sensor to obtain the gesture of the user. The pressure sensor acquires the pressure signal generated by compressing the pressure sensor when the finger moves and thus causes deformation of the extensor tendon sheath of the finger. The deformation of the extensor tendon sheath caused by different movements of different fingers varies, such that the pressure sensor is subjected to different pressures, thereby generating different pressure signals. In the embodiment, corresponding user gesture is determined based on the magnitude of the pressure in the pressure signal. The processor in the wearable device may also be used to process the user gestures, and enable, disable or control corresponding functions of the wearable device according to gesture actions corresponding to the user gestures.

Figure 3:
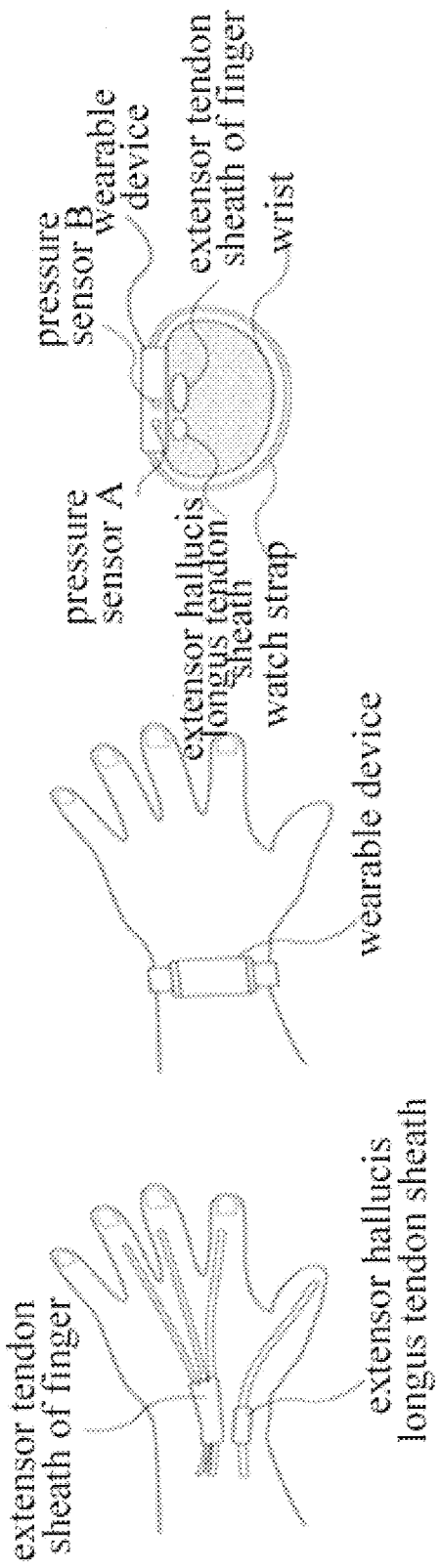
FIG. 3 is a schematic diagram illustrating the physiological and anatomical structure of the hand (the tendon sheath corresponding to the index finger and thumb) and the position of a pressure sensor in the gesture-based display interface control method of the present disclosure.

It should be noted that, according to the physiological mechanism of the hand, the extensor tendon of the finger tracts the muscle to drive the index finger to flex and abduct, so that the extensor tendon sheath may be deformed, and the extensor hallucis longus tendon tracts the muscle to drive the thumb to flex and abduct, so that the extensor hallucis longus tendon sheath may be deformed, and these deformations can be detected by the pressure sensor at the wrist. In the embodiment, taking FIG. 3 as an example, the wearable device is provided with two pressure sensors, A and B, the sensor A is used to detect the movement of the index finger, and the sensor B is used to detect the movement of the thumb. It is easy to understand that the deformation of the tendon sheath caused by finger flexion and the deformation caused by finger abduction are different, and gesture information of the user can be obtained based on different pressure sensor signals generated by different deformations. In the embodiment, the wearable device has a display interface, so that operations can be more specific and visualized through the display interface when the user performs the remote gesture operation. Compared to the related art, the embodiment can operate the interactive controls on the display interface, and the current display interface is the display interface on which the user intends to select the interactive controls. In addition, it should also be noted that the two sensors in FIG. 3 are used to detect the movement direction of the index finger and the movement direction of the thumb respectively; however, in the embodiment, three or more sensors may be provided to detect the fingers of the user, and the fingers are not limited to the index finger and the thumb, and the movement direction of a middle finger or a ring finger, etc. can also be detected. Specific settings are made according to actual needs, and are not limited in the embodiment.

It should be noted that in the embodiment, the current display interface can be switched, and interactive controls (widgets) on the current display interface can be further operated. The first gesture is used to switch the current display interface, and the interactive controls on the current display interface can be further operated based on other gestures of the user. In the embodiment, it is to determine whether the user intends to switch the current display interface or intends to further operate the interactive controls on the current display interface according to the duration of the first gesture. Specifically, after the first gesture of the user is obtained according to the pressure signal of the pressure sensor, the holding time of the first gesture is detected to determine whether the first gesture is kept for more than a preset time. The preset time can be set according to the actual situations, and it is not limited in the embodiment.

Step S20: if the first gesture is kept for more than the preset time, displaying a target virtual gesture point on the current display interface.

It should be noted that if the first gesture is kept for more than the preset time, it means that the interactive controls on the current display interface can be further operated. The gesture control of the wearable device is substantially a remote operation in which the user does not actually perform a touch operation on the display screen of the wearable device. In the embodiment, the operation is performed by generating a virtual gesture point to simulate the touch operation on the display screen by the user. A target virtual gesture point is generated on the current display interface of the wearable device to simulate a virtual touch point of the user's finger, and a corresponding operation can be performed on the target virtual gesture point according to the user's gesture action; for example, the target virtual gesture point may be moved up or down on the current display interface.

Step S30: acquiring a second gesture of the user, and moving the target virtual gesture point on the current display interface according to the second gesture.

Figure 4:
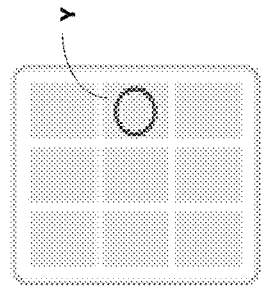
FIG. 4 is a schematic diagram illustrating the movement of the virtual gesture point in a nine-square grid display interface in the gesture-based display interface control method of the present disclosure.
Figure 4:
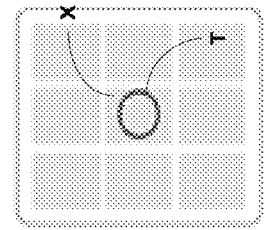

In a specific implementation, after acquiring the second gesture of the user, the movement orientation of the target virtual gesture point can be determined according to the second gesture, and then the target virtual gesture point can be moved to a target position. The movement of the target virtual gesture point starts from a preset position. For example, when the current display interface is a nine-square grid, the center point of the nine-square grid can be used as the preset position of the target virtual gesture point. As illustrated in FIG. 4, T is the target gesture point, X is the preset position of the target gesture point T, and Y is the target position of the target gesture point T. The preset position can be set according to the display interface of the wearable device. This is not limited in the embodiment.

In the present disclosure, the method includes: acquiring a first gesture of a user, and determining whether the first gesture is kept for more than a preset time; if the first gesture is kept for more than the preset time, displaying a target virtual gesture point on the current display interface; and acquiring a second gesture of the user, and moving the target virtual gesture point on the current display interface according to the second gesture. According to the method, the virtual gesture point is displayed on the display interface, and the virtual gesture point is randomly moved on the display interface, so that any interactive control on the current display interface can be operated, and gesture control is more intelligent and comprehensive while improving the accuracy of gesture control.

Figure 5:
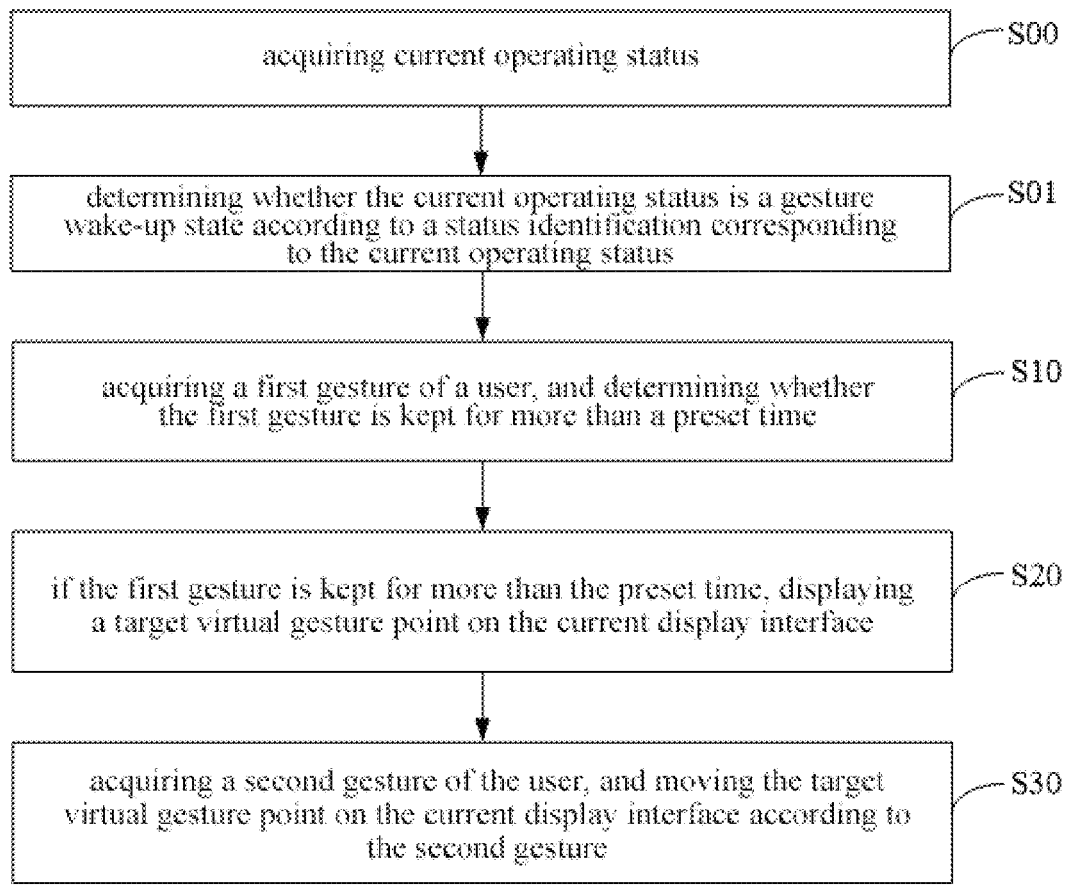
FIG. 5 is a schematic flowchart of a second embodiment of the gesture-based display interface control method according to the present disclosure.

Referring to FIG. 5, FIG. 5 is a schematic flowchart of a second embodiment of the gesture-based display interface control method according to the present disclosure.

Based on the above-mentioned first embodiment, the gesture-based display interface control method of the embodiment further includes: before the step S10, Step S00: acquiring the current operating status.

It should be noted that the current operating status means an operating status of the wearable device at the current moment, the operating status includes but is not limited to the state of human health, the state of reminding memos, or the state of gesture wake-up and the like. In the embodiment, the current operating status can be acquired based on the setting of the scenario function mode in the wearable device, and the current operating status can also be acquired based on a status identification. The specific acquiring method can be set according to the actual situation, and is not limited in the embodiment.

Step S01: determining whether the current operating status is a gesture wake-up state according to a status identification corresponding to the current operating status.

In a specific implementation, after acquiring the current operating status, a status identification corresponding to the current operating status is extracted, and then it is determined whether the current operating status is a gesture wake-up state according to the status identification. For example, the status identification corresponding to the gesture wake-up state is S, assuming that the status identification of the current operating status X is obtained as A, it can be determined that the current operating status X is not a gesture wake-up state, and assuming that the status identification of the current operating status Y is obtained as S, it can be determined that the current operating status Y is a gesture wake-up state.

Furthermore, if the current operating status is a gesture wake-up state, it means that the user can operate the display interface of the wearable device through gestures. In the embodiment, in the current operating status, an initial virtual gesture point is displayed on the display interface. The initial virtual gesture point can be used to switch the display interface of the wearable device when the first gesture is kept within the preset time.

It will be understood that only when the wearable device is in the gesture wake-up state, the user can perform remote operations on the wearable device through gesture actions, so it is necessary to adjust the wake-up state of the wearable device. Specifically, after the step S01, the method further includes: if the current operating status is not a gesture wake-up state, acquiring an activation gesture of the user in real time; and if the number of times the activation gesture is acquired within a preset time interval reaches a preset number, adjusting the current operating status to the gesture wake-up state.

It should be noted that a first pressure sensor is a pressure sensor corresponding to the user's index finger and can obtain a pressure signal generated by the action of the user's index finger, and a second pressure sensor is a pressure sensor corresponding to the user's thumb and can obtain a pressure signal generated by the action of the user's thumb action. When the user uses a wearable device such as a smart watch or a smart bracelet, such wearable device is generally worn on the wrist to directly collect the actions of the user's index finger and thumb; however, the index finger and thumb are commonly used fingers in the user's daily life, and if an enabling condition of corresponding gesture wake-up state is not set, any action of the user in normal life and work will cause an operation on the display interface of the wearable device or the interactive controls on the display interface, which is unreasonable. In order to avoid this situation, in the embodiment, it is embodied by determining whether an activation gesture of the user, that is, a gesture of the user where the index finger and thumb are pinched, is obtained by simultaneously acquiring the pressure signal of the first pressure sensor and the pressure signal of the second pressure sensor, and determining whether the user intends to activate the gesture activation state of the wearable device according to the number of times of the activation gesture obtained within a preset time interval. A preset number of times can be set to two, or it may be set according to the actual situation, it is not limited in the embodiment, and two preset times are taken as an example for illustration. In the embodiment, the time interval can be determined according to corresponding different moments when the activation gesture is received for the first time and the second time, and the time interval is compared with the preset time interval. When the time interval is less than or equal to the preset time interval, the operating status of the wearable device is adjusted to the gesture wake-up state. For ease of understanding, an example is given below, assuming that a first index finger pinching action of the user is obtained at time $T_1$, that is, an activation gesture of the user is obtained for the first time, and time $T_2$ can be determined according to the preset time interval T, that is, $T_2=T_1+T$, and assuming that the preset number of times is twice, if the activation gesture of the user is acquired again within the time interval between $T_1$ and $T_2$, the current operating status is adjusted to the gesture wake-up state.

Furthermore, after the step S01, the method further includes: if the first gesture is not kept for more than the preset time, extracting a first gesture action from the first gesture; determining a first finger movement direction of the user according to the first gesture; and switching the current display interface through the initial virtual gesture point according to the first finger movement direction.

It will be understood that if the first gesture is not kept for more than the preset time, it means that the user intends to switch the current display interface of the wearable device. In the embodiment, the current display interface is operated according to the first gesture, and the operation includes sliding the current display interface down, up, left, or right, so as to switch the current display interface to other display interfaces of the wearable device by sliding. Here, a sliding direction is determined according to the first finger movement direction corresponding to the first gesture, and the finger movement direction includes cases of flexion and abduction. For example, when the first finger movement direction is a direction of flexion movement, the current display interface of the wearable device is slid through an initial virtual gesture point. The finger movement direction and the setting of the sliding manner can be set according to the actual situation, and it is not limited in the embodiment.

Figure 6A:
FIG. 6*a* is a schematic diagram of screen operation corresponding to an embodiment of the gesture-based display interface control method in which the finger movement direction is a direction with flexion of the index finger according to the present disclosure.
Figure 6A:
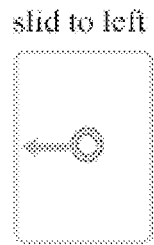
Figure 6B:
FIG. 6*b* is a schematic diagram of screen operation corresponding to an embodiment of the gesture-based display interface control method in which the finger movement direction is a direction with abduction of the index finger according to the present disclosure.
Figure 6B:
Figure 6C:
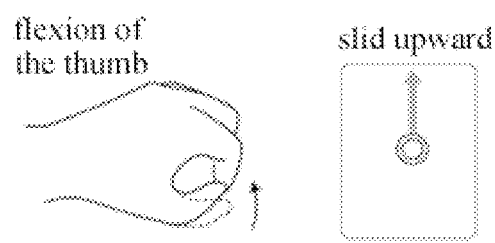
FIG. 6*c* is a schematic diagram of screen operation corresponding to an embodiment of the gesture-based display interface control method in which the finger movement direction is a direction with flexion of the thumb according to the present disclosure.
Figure 6D:
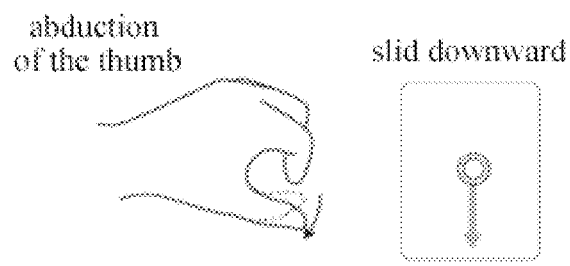
FIG. 6*d* is a schematic diagram of screen operation corresponding to an embodiment of the gesture-based display interface control method in which the finger movement direction is a direction with abduction of the thumb according to the present disclosure.

Furthermore, in the embodiment, the finger movement direction includes the movement direction of index finger and the movement direction of thumb, FIGS. 6*a*, 6*b*, 6*c* and 6*d* are taken as an example for illustration. As illustrated in FIG. 6*a*, when the finger movement direction is a direction with flexion of the index finger, the current display interface of the wearable device is slid to the left through the initial virtual gesture point; as illustrated in FIG. 6*b*, when the finger movement direction is a direction with abduction of the index finger, the current display interface of the wearable device is slid to the right through the initial virtual gesture point; as illustrated in FIG. 6*c*, when the finger movement direction is a direction with flexion of the thumb, the current display interface of the wearable device is slid upward through the initial virtual gesture point; as illustrated in FIG. 6*d*, when the finger movement direction is a direction with abduction of the thumb, the current display interface of the wearable device is slid thumb through the initial virtual gesture point.

In the embodiments, the method includes: acquiring the current operating status; determining whether the current operating status is a gesture wake-up state according to a status identification corresponding to the current operating status; if the current operating status is not a gesture wake-up state, acquiring an activation gesture of the user in real time; and if the number of times the activation gesture is acquired within a preset time interval reaches a preset number, adjusting the current operating status to the gesture wake-up state. According to the method, the user can not only switch the current display interface of the wearable device, but also can further operate the interactive controls on the current display interface, so that the gesture control of the wearable device can be more flexible, with multiple operating modes, improving the user experience.

Figure 7:
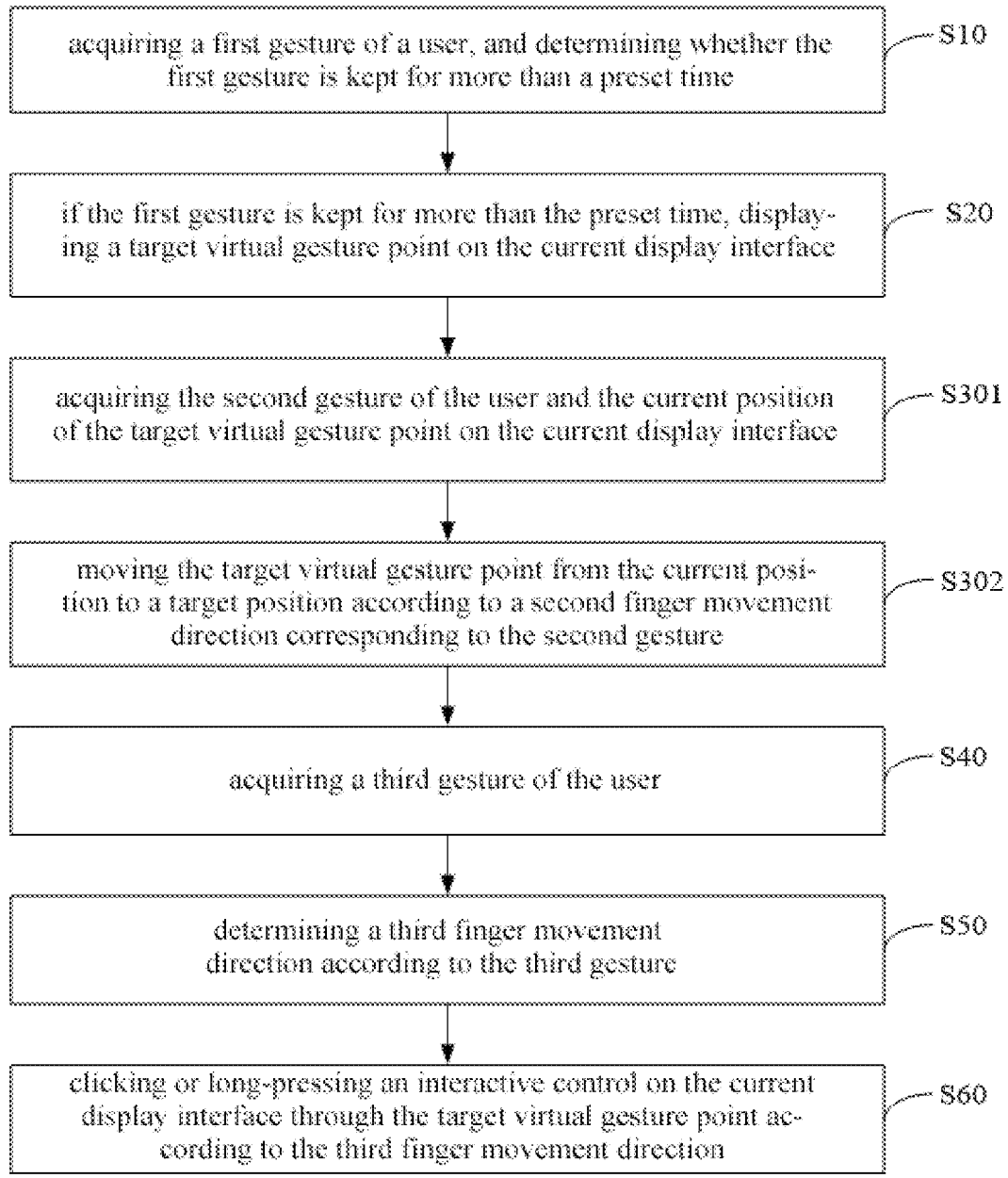
FIG. 7 is a schematic flowchart of a third embodiment of the gesture-based display interface control method according to the present disclosure.

Referring to FIG. 7, FIG. 7 is a schematic flowchart of a third embodiment of the gesture-based display interface control method according to the present disclosure.

A third embodiment of a gesture-based display interface control method of the present disclosure is proposed based on the above-mentioned first embodiment and second embodiment, and is described based on the above-mentioned first embodiment as an example.

In the embodiment, the step S30 includes:

Step S301: acquiring the second gesture of the user and the current position of the target virtual gesture point on the current display interface.

It should be noted that in the embodiment, further operations of the user on the interactive controls on the display interface is implemented through a target virtual gesture point. The target virtual gesture point is obtained by converting the initial virtual gesture point, for example, the target virtual gesture point may be obtained by changing the display style of the initial virtual gesture point. After obtaining the target virtual gesture point, the current position of the target virtual gesture point may be obtained. The current position corresponds to the initial position of the target virtual gesture point moved by the user.

Step S302: moving the target virtual gesture point from the current position to a target position according to a second finger movement direction corresponding to the second gesture.

It should be noted that after the second gesture is acquired, the movement orientation can be determined according to the second gesture. The movement orientation refers to the distance and direction required for the target virtual gesture point to move. Specifically, the second finger movement direction of the user can be extracted from the second gesture, and the movement orientation can be determined according to the second finger movement direction. For example, when the finger movement direction is a direction with flexion of the index finger, assuming that the current display interface of the wearable device is a nine-square grid display interface, a target movement orientation corresponding to the flexion of the index finger is to move the target virtual gesture point up one grid. After determining the target movement orientation and preset position, the target position of the target virtual gesture point can be determined according to the movement orientation and the current position. For example, if the preset position may be the center point of the nine-square grid display interface, and the target movement direction is to move up one grid, then the target position may be determined as the center point of a top layer of the nine-square grid. Finally, after the target position is determined, the target virtual gesture point can be moved.

Further, after the step S30, the method includes:

Step S40: acquiring a third gesture of the user.

It should be noted that moving the target virtual gesture point is to operate the interactive controls of the current display interface. Therefore, after moving the target virtual gesture point, it is needed to reacquire the current gesture of the user, that is, the third gesture. The third gesture is used to operate the interactive controls of the target position after determining the target position of the target virtual gesture point.

Step S50: determining a third finger movement direction according to the third gesture.

It should be noted that determining a third finger movement direction according to the third gesture can be implemented in the manner described above, and the third finger movement direction includes, but is not limited to, clicking down with the index finger and clicking down with the index finger for one second.

Step S60: clicking or long-pressing an interactive control on the current display interface through the target virtual gesture point according to the third finger movement direction.

It should be noted that after the movement of the target virtual gesture point is completed, the interactive control can be clicked or long-pressed through the target virtual gesture point. If the index finger clicks down, the interactive control corresponding to the target position can be clicked through the target virtual gesture point; if the index finger clicks down and lasts for more than one second, the interactive control corresponding to the target position can be long-pressed through the target virtual gesture point. In the embodiment, the interactive control can be double-clicked with flexion of the thumb, and the specific setting manner can be changed according to the actual situation, which is not limited in the embodiment.

In the embodiment, the method includes: acquiring the second gesture of the user and the current position of the target virtual gesture point on the current display interface; moving the target virtual gesture point from the current position to a target position according to a second finger movement direction corresponding to the second gesture; then acquiring a third gesture of the user; determining a third finger movement direction according to the third gesture; and clicking or long-pressing an interactive control on the current display interface through the target virtual gesture point according to the third finger movement direction. According to the method, the user can click or long-press the interactive control corresponding to the target position, which improves the accuracy of the gesture control of the wearable device.

In addition, the present disclosure also provides a storage medium, on which a gesture-based display interface control program is stored, and when the gesture-based display interface control program is executed by a processor, steps of the above-mentioned gesture-based display interface control method are implemented.

Since the storage medium adopts all the technical solutions of the above-mentioned embodiments, it at least has all the beneficial effects brought by the technical solutions of the above-mentioned embodiments, which will not be repeated herein.

Figure 8:
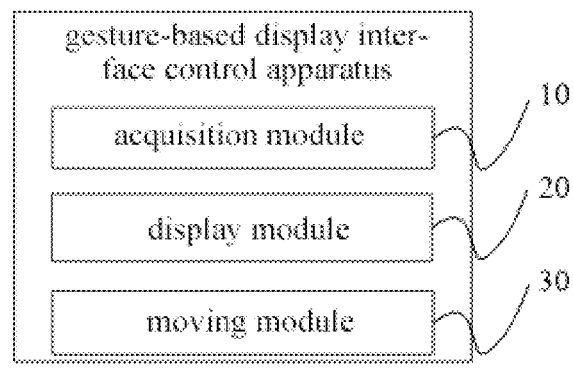
FIG. 8 is a structural block diagram of a first embodiment of a gesture-based display interface control apparatus according to the present disclosure.

Referring to FIG. 8, FIG. 8 is a structural block diagram of a first embodiment of gesture-based display interface control apparatus according to the present disclosure.

As illustrated in FIG. 8, the gesture-based display interface control apparatus of the present disclosure includes:
  an acquisition module 10 configured to acquire a first gesture of a user, and to determine whether the first gesture is kept for more than a preset time;
  a display module 20 configured to display a target virtual gesture point on current display interface if the first gesture is kept for more than the preset time; and
  a moving module 30 configured to acquire a second gesture of the user, and to move the target virtual gesture point on the current display interface according to the second gesture.

In the present disclosure, the apparatus is configured to acquire a first gesture of a user, and determine whether the first gesture is kept for more than a preset time; display a target virtual gesture point on the current display interface if the first gesture is kept for more than the preset time; and acquire a second gesture of the user, and move the target virtual gesture point on the current display interface according to the second gesture. According to the apparatus, the virtual gesture point is displayed on the display interface, and the virtual gesture point is randomly moved on the display interface, so that any interactive control on the current display interface can be operated, and gesture control is more intelligent and comprehensive while improving the accuracy of gesture control.

In an embodiment, the gesture-based display interface control apparatus further includes a detection module.

The detection module is configured to: acquire the current operating status; determine whether the current operating status is a gesture wake-up state according to a status identification corresponding to the current operating status; and if the current operating status is a gesture wake-up state, display an initial virtual gesture point on the current display interface.

In an embodiment, the gesture-based display interface control apparatus further includes an adjustment module.

The adjustment module is configured: to acquire, if the current operating status is not a gesture wake-up state, an activation gesture of the user in real time; and to adjust, if the number of times the activation gesture is acquired within a preset time interval reaches a preset number, the current operating status to the gesture wake-up state.

In an embodiment, the gesture-based display interface control apparatus further includes a control module.

The control module is configured: to extract, if the first gesture is not kept for more than the preset time, a first gesture action from the first gesture; to determine a first finger movement direction of the user according to the first gesture; and to switch the current display interface through the initial virtual gesture point according to the first finger movement direction.

In an embodiment, the control module is further configured: to swipe left or right to switch the current display interface through the initial virtual gesture point when the first finger movement direction is a direction with flexion of a index finger or abduction of the index finger; and swipe up or down to switch the current display interface through the initial virtual gesture point when the first finger movement direction is a direction with flexion of a thumb or abduction of the thumb.

In an embodiment, the moving module 30 is further configured to acquire the second gesture of the user and the current position of the target virtual gesture point on the current display interface; and to move the target virtual gesture point from the current position to a target position according to a second finger movement direction corresponding to the second gesture.

In an embodiment, the moving module 30 is further configured to acquire a third gesture of the user; to determine a third finger movement direction according to the third gesture; and to click or long-press an interactive control on the current display interface through the target virtual gesture point according to the third finger movement direction.

It should be understood that the above contents are only examples, and do not constitute any limitation to the technical solutions of the present disclosure. In specific applications, those skilled in the art can make settings as needed, and the present disclosure is not limited thereto.

It should be noted that the workflow described above is only illustrative and does not limit the protection scope of the present disclosure. In practical applications, those skilled in the art can select part or all of them to implement the embodiments of the present disclosure according to actual needs, and the present disclosure is not limited thereto.

In addition, for technical details that are not exhaustively described in the embodiments, reference can be made to the gesture-based display interface control method provided in any embodiment of the present disclosure, which will not be repeated here.

Further, it should be noted that terms such as "comprises", "includes" or any other variation thereof are intended to encompass a non-exclusive inclusion such that a process, method, article or system that includes a series of elements includes not only those elements, but also other elements not explicitly listed, or elements inherent to such a process, method, article or system. Without further limitation, the element defined by the phrase "comprising a . . . " does not preclude the presence of additional identical elements in the process, method, article or system including the element.

The serial numbers of the above embodiments of the present disclosure are for description only, and do not represent any advantages and disadvantages of the embodiments.

Through the description of the above embodiments, those skilled in the art can clearly understand that the above embodiments can be implemented by means of software plus a necessary general-purpose hardware platform, and of course can also be implemented by hardware, but in many cases the former is regarded as better implementation. Based on such an understanding, the essence of the technical solution of the present disclosure or the part that contributes to the related art can be embodied in the form of a software product, and the computer software product is stored in a storage medium (such as read only memory (ROM)/RAM, magnetic disk, optical disk), includes several instructions to enable a terminal device (such as mobile phone, computer, server, network device, etc.) to execute the method described in various embodiments of the present disclosure.

The above are only preferred embodiments of the present disclosure, and are not intended to limit the patent scope of the present disclosure. Any equivalent structure or equivalent process conversion made by using the contents of the description and accompanying drawings of the present disclosure, or applications directly or indirectly applied in other related technical fields, will all be included in the scope of patent protection of the present disclosure.

What is claimed is:

1. A gesture-based display interface control method, which is applied to a wearable device, comprising:
    acquiring a first gesture of a user, and determining whether the first gesture is kept for more than a preset time;
    if the first gesture is kept for more than the preset time, displaying a target virtual gesture point on a current display interface; and
    acquiring a second gesture of the user, and moving the target virtual gesture point on the current display interface according to the second gesture,
    wherein before acquiring the first gesture of the user and determining whether the first gesture is kept for more than the preset time,
    acquiring current operating status;
    determining whether the current operating status is a gesture wake-up state according to a status identification corresponding to the current operating status; and
    if the current operating status is the gesture wake-up state, displaying an initial virtual gesture point on the current display interface, and acquiring the first gesture of the user, and determining whether the first gesture is kept for more than the preset time,
    wherein after determining whether the current operating status is the gesture wake-up state according to the status identification corresponding to the current operating status,
    if the current operating status is not the gesture wake-up state, acquiring an activation gesture of the user in real time; and
    if a number of times that the activation gesture is acquired within a preset time interval reaches a preset number, adjusting the current operating status to the gesture wake-up state.

2. The gesture-based display interface control method of claim 1, further comprising: after acquiring the first gesture of the user, and determining whether the first gesture is kept for more than the preset time,
    if the first gesture is not kept for more than the preset time, extracting a first gesture action from the first gesture;
    determining a first finger movement direction of the user according to the first gesture; and
    switching the current display interface through the initial virtual gesture point according to the first finger movement direction.

3. The gesture-based display interface control method of claim 2, wherein switching the current display interface through the initial virtual gesture point according to the first finger movement direction comprises:
    when the first finger movement direction is a direction with flexion of an index finger or abduction of the index finger, swiping left or right to switch the current display interface through the initial virtual gesture point; and
    when the first finger movement direction is a direction with flexion of a thumb or abduction of the thumb, swiping up or down to switch the current display interface through the initial virtual gesture point.

4. The gesture-based display interface control method of claim 1, wherein acquiring the second gesture of the user, and moving the target virtual gesture point on the current display interface according to the second gesture comprises:
    acquiring the second gesture of the user and the current position of the target virtual gesture point on the current display interface; and
    moving the target virtual gesture point from the current position to a target position according to a second finger movement direction corresponding to the second gesture.

5. The gesture-based display interface control method of claim 1, further comprising: after acquiring the second gesture of the user, and moving the target virtual gesture point on the current display interface according to the second gesture,
    acquiring a third gesture of the user;
    determining a third finger movement direction according to the third gesture; and
    clicking or long-pressing an interactive control on the current display interface through the target virtual gesture point according to the third finger movement direction.

6. A wearable device, wherein the wearable device comprises: a memory, a processor, and a gesture-based display interface control program stored in the memory and operable on the processor, wherein the gesture-based display interface control program is configured to implement steps of the gesture-based display interface control method of claim 1.

7. A non-transitory storage medium, wherein a gesture-based display interface control program is stored on the storage medium, wherein when the gesture-based display interface control program is executed by a processor, steps of the gesture-based display interface control method of claim 1 are implemented.

* * * * *